(12) United States Patent
Kemnitz et al.

(10) Patent No.: US 10,290,961 B2
(45) Date of Patent: May 14, 2019

(54) HIGH CURRENCY CONNECTION

(71) Applicant: Rausch & Pausch GmbH, Selb (DE)

(72) Inventors: Rocco Kemnitz, Bobenneukirchen (DE); Frank Lauterbach, Höchstädt (DE); Jörg Bauer, Selb (DE); Falk Lehniger, Oelsnitz (DE)

(73) Assignee: Rausch & Pausch GmbH, Selb (DE)

( * ) Notice: Subject to any disclaimer, the term of this patent is extended or adjusted under 35 U.S.C. 154(b) by 0 days.

(21) Appl. No.: 15/716,189

(22) Filed: Sep. 26, 2017

(65) Prior Publication Data

US 2018/0090859 A1 Mar. 29, 2018

(30) Foreign Application Priority Data

Sep. 26, 2016 (DE) .................. 10 2016 118 163

(51) Int. Cl.
*H01R 9/24* (2006.01)
*H02K 5/22* (2006.01)
(Continued)

(52) U.S. Cl.
CPC ........ *H01R 9/2416* (2013.01); *B60L 11/1818* (2013.01); *F04B 17/03* (2013.01);
(Continued)

(58) Field of Classification Search
CPC ............. H01R 9/2416; H01R 13/6215; H01R 13/6581; H01R 13/523; H01R 11/32;
(Continued)

(56) References Cited

U.S. PATENT DOCUMENTS 7,097,498 B2   8/2006   Miyazaki
7,306,475 B2   12/2007  Tsuruta
(Continued)

FOREIGN PATENT DOCUMENTS

AU   2002332237 B2   6/2005
AU   2002332237 B9   7/2005
(Continued)

OTHER PUBLICATIONS

German Patent & Trademark Office, International Standard ISO20653:2013(E), "Road vehicles-Degrees of protection [IP code]- Protection of electrical equipment against foreign objects, water and access", dated Feb. 15, 2013, in connection with the application No. 10 2016 118 163.3 (30 pages).
(Continued)

*Primary Examiner* — Jean F Duverne
(74) *Attorney, Agent, or Firm* — Maier & Maier, PLLC

(57) ABSTRACT

A connection device for high currents for detachably connecting an electrified apparatus, e-apparatus, with a terminal current conductor, to a respective terminal device and to a respective line terminal device. A terminal part is fastenable to a housing part of the e-apparatus and a connection current conductor extends through the terminal part into the interior of the housing and at an end there is connectable with the current terminal and at a different end has a first contact area; through the line terminal part there is led the terminal current conductor and the line terminal part is form-fittingly inserted at least partly in a receiving mechanism at the terminal part such that the first contact area contacts a second contact area of the terminal current conductor.

19 Claims, 5 Drawing Sheets

(51) Int. Cl.

| | | |
|---|---|---|
| *F04B 17/03* | (2006.01) | |
| *H01R 4/34* | (2006.01) | |
| *H01R 13/523* | (2006.01) | |
| *H01R 13/621* | (2006.01) | |
| *B60L 11/18* | (2006.01) | |

(52) U.S. Cl.
CPC .............. *H01R 4/34* (2013.01); *H01R 13/523* (2013.01); *H01R 13/6215* (2013.01); *H02K 5/225* (2013.01); *B60L 2230/12* (2013.01); *F04C 2240/803* (2013.01); *H01R 2201/26* (2013.01); *Y02T 10/641* (2013.01); *Y02T 10/7005* (2013.01); *Y02T 10/7088* (2013.01); *Y02T 90/121* (2013.01); *Y02T 90/14* (2013.01)

(58) Field of Classification Search
CPC .... H01R 12/777; H01R 4/34; H01R 2201/26; H01M 2/20; F04B 17/03; H02K 5/225; F04C 2240/803
USPC .......................................................... 439/709
See application file for complete search history.

(56) References Cited

U.S. PATENT DOCUMENTS

| | | | | |
|---|---|---|---|---|
| 8,662,920 | B2 * | 3/2014 | Ishibashi ............ | H01R 13/6592 439/564 |
| 8,672,700 | B2 * | 3/2014 | Matsumoto ............ | H01M 2/20 439/364 |
| 9,293,866 | B2 * | 3/2016 | Tanaka ................ | H01R 12/777 |
| 9,653,858 | B2 * | 5/2017 | Hanke ................... | H01R 11/32 |
| 9,722,361 | B2 * | 8/2017 | Tanaka ............... | H01R 13/6581 |
| 9,750,147 | B2 * | 8/2017 | Kosuga ................ | H02M 7/003 |
| 2004/0266270 | A1 | 12/2004 | Miyazaki | |
| 2007/0089696 | A1* | 4/2007 | Moriya .................. | F01L 1/344 123/90.15 |
| 2007/0207652 | A1 | 9/2007 | Tsuruta | |
| 2012/0042657 | A1* | 2/2012 | Hodinot ................. | F02C 7/232 60/772 |
| 2015/0267699 | A1 | 9/2015 | Pippes et al. | |
| 2015/0267701 | A1 | 9/2015 | Pippes et al. | |

FOREIGN PATENT DOCUMENTS

| | | |
|---|---|---|
| CA | 2457726 A1 | 3/2003 |
| CA | 2457726 C | 3/2008 |
| DE | 1515772 C3 | 1/1976 |
| DE | 200 22 774 U1 | 4/2002 |
| DE | 10140177 A1 | 4/2003 |
| DE | 10297173 T5 | 9/2004 |
| DE | 102004030809 A1 | 2/2005 |
| DE | 10 2014 201 190 A1 | 7/2015 |
| DE | 102014103958 A1 | 9/2015 |
| DE | 102014103959 A1 | 9/2015 |
| DE | 102007008098 B4 | 12/2015 |
| EP | 2921702 A2 | 9/2015 |
| WO | 2016/035476 A1 | 3/2016 |

OTHER PUBLICATIONS

Extended European Search Report dated Feb. 22, 2018, in connection with corresponding EP Application No. 17192961.5 (8 pgs.).

* cited by examiner

HIGH CURRENCY CONNECTION

The invention relates in general to interfaces for supplying an electrified apparatus (e-apparatus) with the necessary electric power. The invention relates, more precisely, to a detachable interface, a terminal device at the e-apparatus and a line terminal device for a terminal line for connection with the terminal device, which together form a connection device for high currents, as well as to an e-apparatus having such a terminal device.

As a result of progressing electrification, in particular in the automotive field, more and more e-apparatuses are installed. These are electric drives as an auxiliary drive in hybrid vehicles or as a main drive in fully electrified vehicles, but also accessory units, as for example of the steering, the chassis etc. Accessory units as e-apparatuses in the automotive field may be e-machines. An example is an electrohydraulic motor-pump unit (MPU), also referred to as power pack. MPUs consist substantially of three main components: a pump unit for pumping a working fluid, an electric-motor unit for driving the pump, and an associated electronic control unit for controlling and/or feedback-controlling the motor unit and/or pump unit. An MPU for applications in the chassis field carries electric power of up to 5 kW. Even when the MPU is operated in a 48 V onboard electrical system in order to limit the electric currents, high currents of 100 A and more still occur. But also with drive units in the electric vehicle field which are designed, for example, for a supply voltage of 400 V, very high currents occur.

DE 10 2014 103 959 A1 and DE 10 2014 103 958 A1 show known MPUs.

Current-carrying terminal current lines must always be protected. The protector will usually be designed with respect to the maximum operating current to be expected, e.g. 125 A. Beside the maximum operating current, the entire region carrying the terminal current must also be able to carry the maximum fault current until the protector responds. In view of such high current loads the electrical linking of such e-apparatuses has to be reliable and secure. One aspect is here to ensure sufficiently low transition resistances at transition points in the region carrying the terminal current. For this purpose, terminal power lines mostly are attached directly in the interior of the e-apparatus and connected with the e-apparatus by means of a known connection technique such as screwing, welding, cold welding, etc. The electric terminal current lines are then firmly connected with the e-apparatus as a "cable tail". In the case of maintenance, such a linking is in principle non-detachable or only detachable with great effort, in particular because this requires an opening of the e-apparatus.

Normally, up to the associated distribution or protection the terminal current lines are often laid in a cable harness integrated with other lines and are fastened thereto. Upon assembly or in the case of maintenance, the terminal current lines and the e-apparatus must hence always be mounted or exchanged together. I.e., in the case of a fault in one of the terminal current lines, the e-apparatus which per se did not went out of service must also be exchanged. Likewise, in case of a failure of the e-apparatus the terminal current lines which may have been complexly laid must also be exchanged. Hence, there is a need for a detachable connection at the e-apparatus.

From the 12 V field there is not known any compact and easy-to-handle detachable connection for the high currents exemplarily mentioned above. Known plug connections typically work with resilient contact elements.

DE 101 40 177 A1 shows a known connection for high currents.

A compact design and sufficiently great contact area of the current-carrying connection elements with sufficiently great contact areas which are reliably pressed together with the necessary contact force, and ensuring at the same time a secure connection therebetween seems hardly realizable.

It is hence the object of the present invention to provide a connection device for high currents as compact as possible, as simply constructed as possible and detachable without destruction for an e-apparatus.

The object is achieved with the respective features of one of the independent claims. Further embodiment examples and advantageous developments are defined in the respectively subsequent subclaims. The features and details which are described in connection with the terminal device according to the invention will apply here, of course, also in connection with the line terminal device according to the invention and respectively vice versa as well as accordingly to the connection device and to an e-apparatus having a terminal unit. Hence, mutual reference is made regarding the disclosure of the individual aspects.

The core of the present invention is the configuration of a detachable, compactly and thus space-savingly constructed connection device for a power terminal for an e-apparatus, such as for example an e-machine, in particular for supplying the e-apparatus with current at a voltage of 12 V to 400 V, preferably at a voltage of 12 V, 24 V, 48 V or 400 V. This can be, for example, a 12 V, 24 V, or 48 V onboard electrical system or a 400 V drive battery (in the field of electric vehicles). The connection device can be detached and re-connected without destruction. On the other hand, the connection device offers a secure mechanical and electrical connection which can transmit high currents, such as e.g. 80 A and more, preferably up to 150 A, at least 125 A. Of course, these currents do not have to be stationary, because an actual current intake of the e-apparatus depends on the actual operating point. I.e., the dimensioning suggested herein depends on the maximum current to be expected. The connection device is configured such that by means of appropriate sealings it is suitable for usage under particular ambient conditions, e.g., in the external region of a vehicle, in particular in the underbody region. I.e., the connection device is able to meet the requirements of the ISO 20653 according to IP6K9K, i.e. without great additional effort it can be realized in a dust-tight fashion and specifically for road vehicles in a fashion protected against water upon high-pressure cleaning and/or steam cleaning. The connection device is attached externally at the e-apparatus and thus freely accessible and can therefore be detached upon assembly or in the case of maintenance and be re-connected. An opening of the housing of the e-apparatus is thus not necessary. The connection device thus makes possible that the assembly of the cable harness can be effected independent of the assembly of the e-apparatus and vice versa. In the case of maintenance the e-apparatus can be exchanged without necessarily having to exchange associated terminal lines as well. Likewise, also an exchange of the terminal lines can be effected, e.g. in case of a damage caused by marten, without exchange of the e-apparatus. The effort upon assembly or dismantling is hence clearly lower both during manufacture and in the case of the maintenance.

The first aspect of the present invention relates to a terminal device of a connection device for high currents for detachably connecting an electrified apparatus (e-apparatus) with a terminal current conductor.

According to the invention the terminal device has: a terminal part which is provided for fastening to a housing part of a housing of the e-apparatus and is arranged for leading a connection current conductor through the terminal part into the interior of the housing, so that the connection current conductor at an internal end in the interior of the housing is connectable with a current terminal, and has a first contact area at its external end; a receiving means into which a line terminal part of a line terminal device, with the terminal current conductor being led through, can be inserted in such a way, that the first contact area can contact a second contact area of the terminal current conductor; and a first connection element integrated in the terminal part, which is arranged to be able to cooperate with a second connection element which, with the line terminal part being inserted, can be inserted through a lead-through in the line terminal part (preferably perpendicular) through the second contact area and (preferably perpendicular) through the first contact area such that the first contact area and the second contact area can be pressed onto each other and at the same time the line terminal part can be fastened to the terminal part.

A second aspect of the present invention relates to a line terminal device of a connection device for high currents for detachably connecting an e-apparatus with a terminal current conductor.

According to the invention the line terminal device has: a line terminal part which is arranged for insertion into a receiving means at a terminal part of a terminal device which is fastened at a housing part of the electrified apparatus and leads a connection current conductor through the terminal part into the interior of the housing, which connection current conductor at its internal end is connected with a current terminal of the electrified apparatus and at its external end has a first contact area; in which through the line terminal part there is led the terminal current conductor which at one end in the terminal part has a second contact area; in which the line terminal part is insertable into the terminal part such that the second contact area can contact the first contact area of the terminal current conductor and a detachable second connection element, with the line terminal part being inserted, can be led through a lead-through in the line terminal part, (preferably perpendicular) through the second contact area and (preferably perpendicular) through the first contact area and can cooperate with a first connection element integrated in the terminal part such that the first contact area and the second contact area are pressed onto each other and at the same time the line terminal part can be detachably fastened to the terminal part.

A third aspect of the present invention relates to a connection device for high currents as a detachable connection for an e-apparatus with a terminal current conductor, in which the connection device has a terminal device according to the first aspect of the invention and a line terminal device according to the second aspect of the invention.

In the connection device according to the invention, the terminal part of the terminal device is fastened at the housing part of the e-apparatus. The connection current conductor extends through the terminal part into the interior of the housing of the e-apparatus, at its internal end is connected with the current terminal of the e-apparatus and has the first contact area at its external end. The terminal current conductor extends through the line terminal part which is inserted into the receiving means at the terminal part such that the first contact area contacts the second contact area. The detachable second connection element extends through the lead-through of the line terminal part inserted in the terminal part, (preferably perpendicular) through the second contact area and (preferably perpendicular) through the first contact area and cooperates with the first connection element integrated in the terminal part such that the first contact area and the second contact area are pressed onto each other and the line terminal part is detachably fastened at the terminal part.

It should be noted that in all the three aspects of the present invention the connection current conductor is electrically insulated preferably by the material of the terminal part, in particular against the housing of the e-apparatus.

The housing and accordingly the housing parts can be made of, for example, die-cast aluminium.

The conductors (terminal current conductor, connection current conductor, current terminal) are made of a good electric conductor, preferably copper, the elements connection current conductor and current terminal can be made of a sheet metal as a basic material, preferably a copper sheet metal.

The connection elements can be made of copper or stainless steel. If the connection elements are made of copper, they will fully contribute to the current carrying, in particular to the respective line cross-section. Connection elements made of stainless steel enable on account of the greater hardness and lower ductility of stainless steel the setting of defined pressure forces at the connections of the contact area.

Terminal part and line terminal part are manufactured preferably as plastic injection molding parts. As a plastic material there is preferably used a thermoplastic material, for example polyamide (PA) and/or polybuthylene terephthalate (PBT). As an insulation for the terminal current conductor there can be used any suitable electric insulator, for example, polyolefin.

In addition, the line terminal part is inserted preferably form-fittingly into the associated receiving means of the terminal part.

The line terminal part can be inserted fully, but at least partly with an insertion portion into the receiving means of the terminal part.

For the (preferably vertical) leading through of the detachable second connection element, the first contact area as well as the second contact area can have respective through holes. With the line terminal part being inserted in the terminal part, accordingly the lead-through in the line terminal part and the through holes in the first contact area as well as in the second contact area are congruent with each other to enable the leading through and inserting of the second connection element.

Preferably, at the line terminal part an external opening of the lead-through for the second connection element is closable with a detachable cap. The cap can be fastened at the line terminal part with a likewise detachable fastening means. The detachable fastening means can be, for example, a screw engaging in a thread formed at the line terminal part. Alternatively, the cap may have an external thread which may engage in an accordingly formed internal thread at the lead-through in the line terminal part and thus can fasten the cap to and in the lead-through by screwing.

The terminal current conductor extends, as soon as the line terminal part is inserted in the terminal part, preferably at least partly in a portion of the line terminal part parallel to the housing of the e-apparatus. In a portion adjoining therein the terminal current conductor then extends in the line terminal part in angled fashion toward the housing of the e-apparatus. Finally, the portion of the terminal current conductor having the portion forming the second contact area in the line terminal part extends parallel to the first contact area disposed in the terminal part.

The first connection element can be disposed directly and firmly at the connection current conductor in the region of the first contact area. In a preferred embodiment, the second connection element is a screw. The first connection element is then an associated connection nut fastened at the connection current conductor in the region of the first contact area. The connection nut may be welded to the connection current conductor, for example by friction welding or spot welding. The connection nut can alternatively be pressed onto or into the connection current conductor in a force-fitting and/or form-fitting and/or material-locking fashion.

The receiving means in the terminal part is preferably formed complementary to the insertion portion of the line terminal part. Preferably, the receiving means and the insertion portion are formed cylindrically and in a mutually matched fashion. This allows the line terminal part to be inserted or removed more easily upon insertion into the receiving means or upon detaching from the receiving means by axially rotating around the cylinder axis. In addition, it is possible, with a suitable dimensioning of the first and second contact areas, that the line terminal part can be fastened to the terminal part in any arbitrary angular position. This allows the terminal line, at the installation place of the e-apparatus, to be led away from the e-apparatus in the direction most suitably there.

Alternatively, it may be desirable that the insertion portion can be inserted into the receiving means only in one single or several predetermined angular position(s). For this purpose, the insertion portion may have an accordingly coded external profile preventing an axial rotation, which profile is configured such that the insertion portion can be inserted into the receiving means, which is configured accordingly, only in the predetermined position or the predetermined positions.

In a further alternative, the line terminal part can have a first profile element preventing an axial rotation which is configured such that it can be joined with an accordingly complementarily formed second profile element at the terminal part only in the predetermined rotational position or the predetermined rotational positions of the line terminal part. I.e., here too the receiving means and the insertion portion can be formed cylindrically and in a mutually matched fashion, so that the insertion portion can be easily inserted into the receiving means, but the insertion portion can be fully inserted into the receiving means only in the predetermined position or the predetermined rotational positions.

A portion of the connection current conductor, at which the first contact area is located, protrudes preferably in a fashion spaced apart from a bottom area of the receiving means of the terminal part into the receiving means. As a result, the portion of the connection current conductor which has the first contact area is, compared with the bottom area of the receiving means, to a certain extent flexible (in the direction perpendicular to the first contact area). This supports the pressing together of the first contact area and the second contact area by means of the detachable second connection element.

A fourth aspect of the present invention relates to an e-apparatus having a terminal device according to the first aspect of the invention for the connection with a line terminal device according to the second aspect of the invention. Here, the terminal device of the connection device is fastened at a housing part of the e-apparatus.

The housing part of the e-apparatus can have a housing lead-through and the terminal part can have a lead-through portion matching the housing lead-through formed complementary.

In a preferred embodiment, the housing part has a housing flange which is prepared for the connection with a further housing part. Preferably, the complementarily formed housing lead-through is located in the housing flange. Then the terminal part first can be fastened with a back side at the housing part and extend with the laterally branching lead-through portion through the housing lead-through, which is formed complementary thereto, in the housing flange into the inside of the further housing part. Thus, the terminal part lies below the maximum circumference of the housing defined by the housing flange. When the height of the line terminal part is substantially due to the insertion portion for the receiving means at the terminal part, the connection apparatus does not entail a greater space requirement of the whole e-apparatus.

In the interior of the housing of the e-apparatus the connection conductor at its end there is connected with the current terminal of the e-apparatus preferably also with a detachable connection. This is advantageous in particular for the embodiment with the housing lead-through in the housing flange, because the electronics or electrical system which is located in the further housing part inserted at the housing flange and at which the current terminal is located can easily be detached from the terminal part as needed, a detachable connection at the current terminal at least facilitates the first assembly of the terminal part. The detachable connection at the current terminal is preferably a screwed connection. However, the detachable connection at the current terminal can also be established with the help of a different connection element detachable basically without destruction of the connection partners, for example a rivet.

The terminal part can be fastened at the housing from outside and/or from inside with one or several connection elements. The one or several connection elements can be a screw or a rivet or the like.

In an especially preferred embodiment, the e-apparatus is an electrified machine (e-machine). The e-machine can be, for example, an electrohydraulic motor-pump unit (MPU) which is composed of a pump unit, a motor unit and a control unit. Particularly preferably, the terminal part is fastened in the region of the housing of the e-machine which is formed by a motor housing as a housing part. The motor housing can have the above-mentioned housing flange at which as a further housing part there is fastened a control housing which houses a control unit of the MPU.

Preferably, the connection device and thus the terminal device and the line terminal device accordingly is a connection dimensioned preferably for a voltage of 12 V to 400 V, preferably a voltage of 12 V, 24 V, 48 V or 400 V, for currents of 80 A and more, preferably up to 150 A. This can be, for example, a current supply from a 12 V, 24 V, or 48 V onboard electrical systems or from a 400 V drive battery. Thus, the connection device is suitable, for example, in particular for all electrified units as an e-apparatus in the automotive field.

It should be finally mentioned that the devices of all above-discussed aspects of the invention can be arranged for the requirements for usage in the outer vehicle region, for example, in the region of the underbody. For meeting the requirements of the ISO 20653 according to IP6K9K, a first seal can be disposed at the line terminal part and/or terminal part, which outwardly seals the receiving means of the terminal part when the line terminal part is inserted. Furthermore, a second seal can be disposed at the line terminal part and/or the cap in such a way that the lead-through in the line terminal part is outwardly sealed. Finally, the housing lead-through and/or the lead-through portion of the terminal part can be provided with a third seal which with the terminal part being mounted seals the housing outwardly.

Further advantages, features and details of the invention will result from the following description, in which a preferred embodiment example of the invention will be described in detail with reference to the drawings. The features mentioned in the claims and in the description may be essential to the invention individually per se or in arbitrary combination. Likewise, the hereinabove mentioned features and those specified hereinbelow may be employed each per se or in groups in arbitrary combination. Members or components similar in function or identical are provided with the same reference signs wherever possible and expedient. The terms "left", "right", "above" and "below" used in the description of the embodiment examples relate to the drawings as oriented with the figure designation or reference signs in the normally legible way. The shown and described preferred embodiment example is not to be understood as exhaustive, but has an exemplary character for explaining the invention. The detailed description is for the skilled person's information, so that known circuits, structures and methods are not shown or explained in detail in the description so as not to impede the understanding of the present description. Hereinafter the invention will be described by way of example with reference to the accompanying drawings. Therein:

Figure 1:
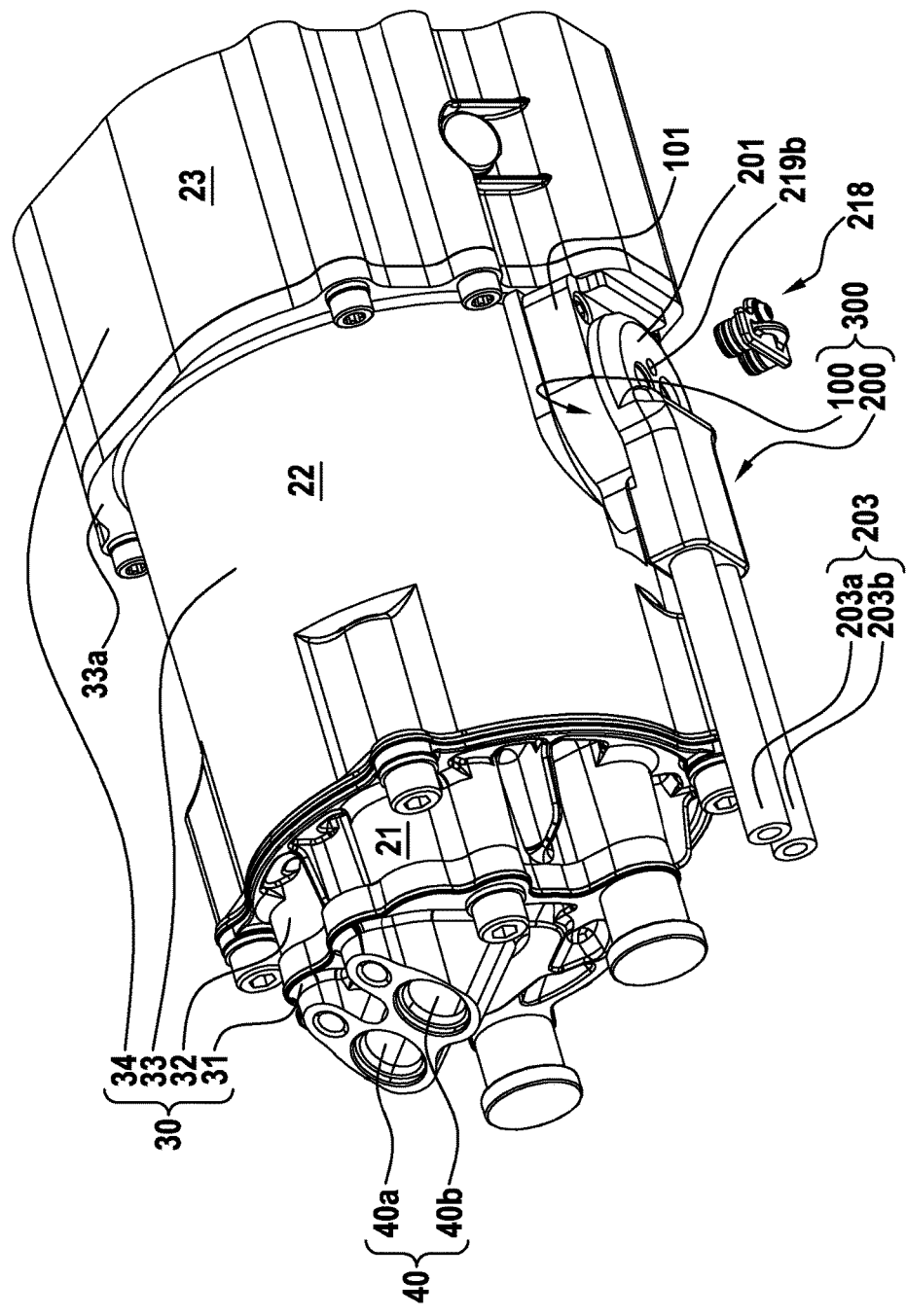
FIG. 1 shows a perspective view of a motor-pump unit (MPU) as an e-apparatus with a connection device according to the invention for connecting the MPU with a terminal line.
Figure 2:
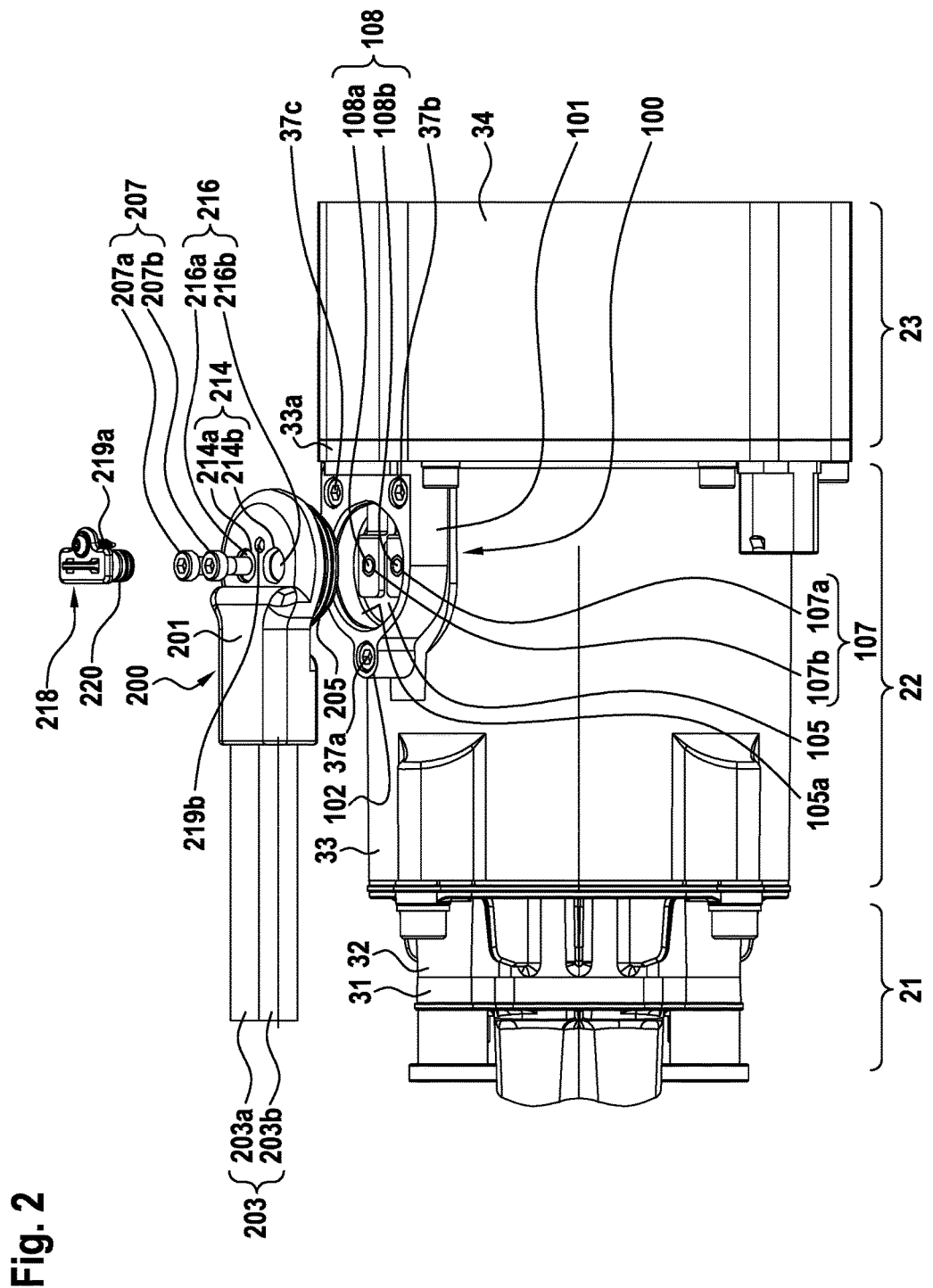
FIG. 2 shows a perspective view of the MPU of FIG. 1 in an oblique top view onto the terminal device, in which the line terminal device is detached from the terminal device.
Figure 3:
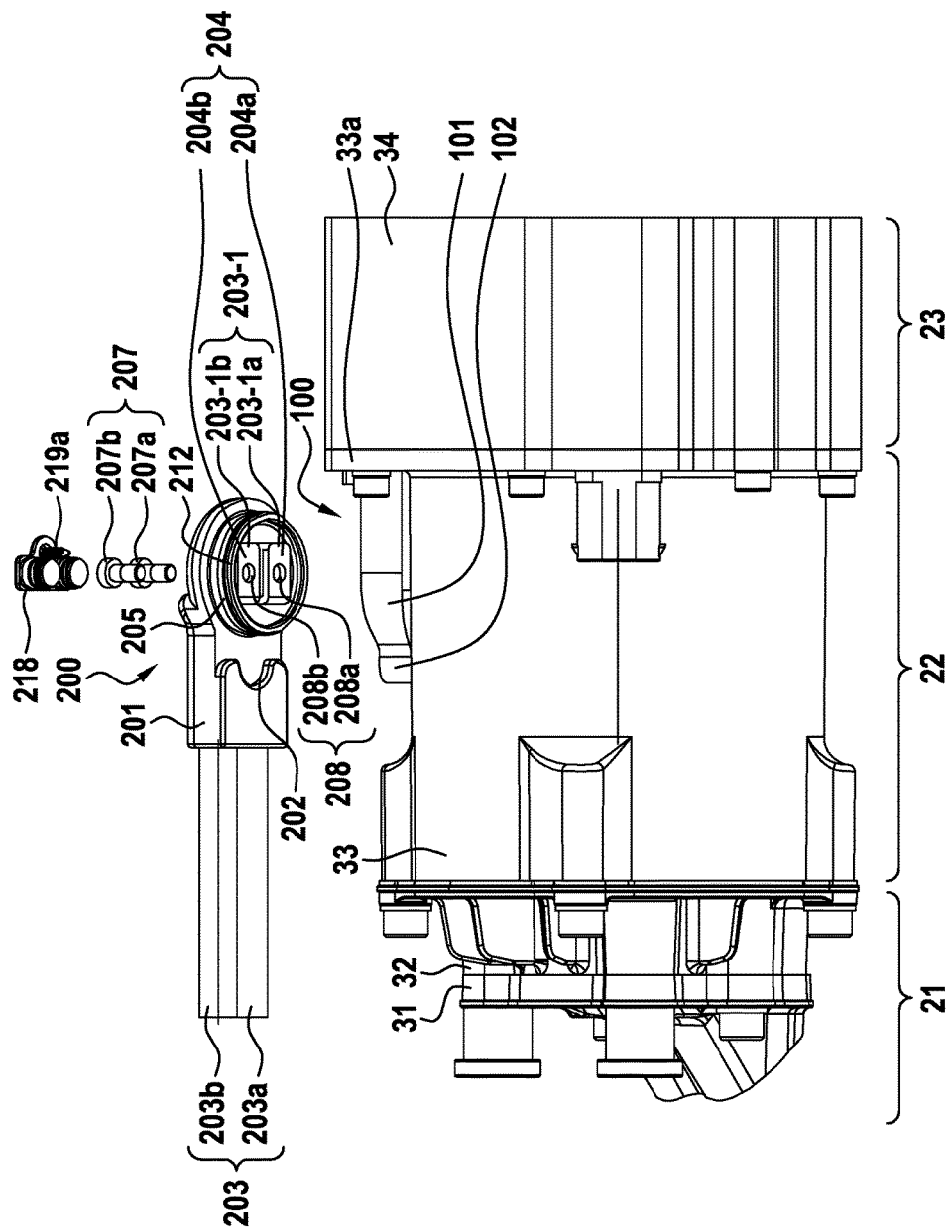
FIG. 3 shows a perspective view of the MPU of FIG. 2 in an oblique top view onto the line terminal device, in which the line terminal device is detached from the terminal device.
Figure 4:
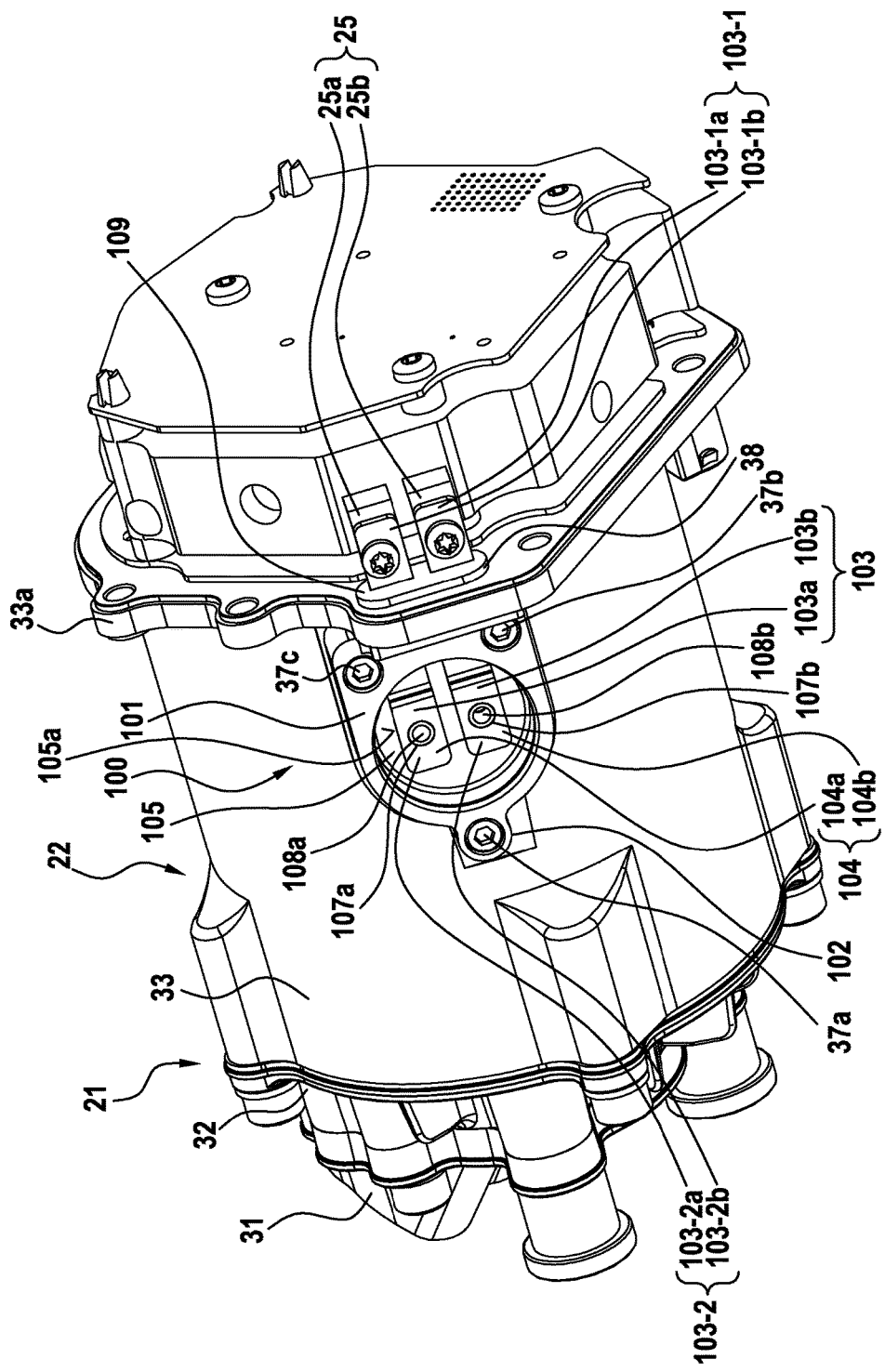
Figure 5:
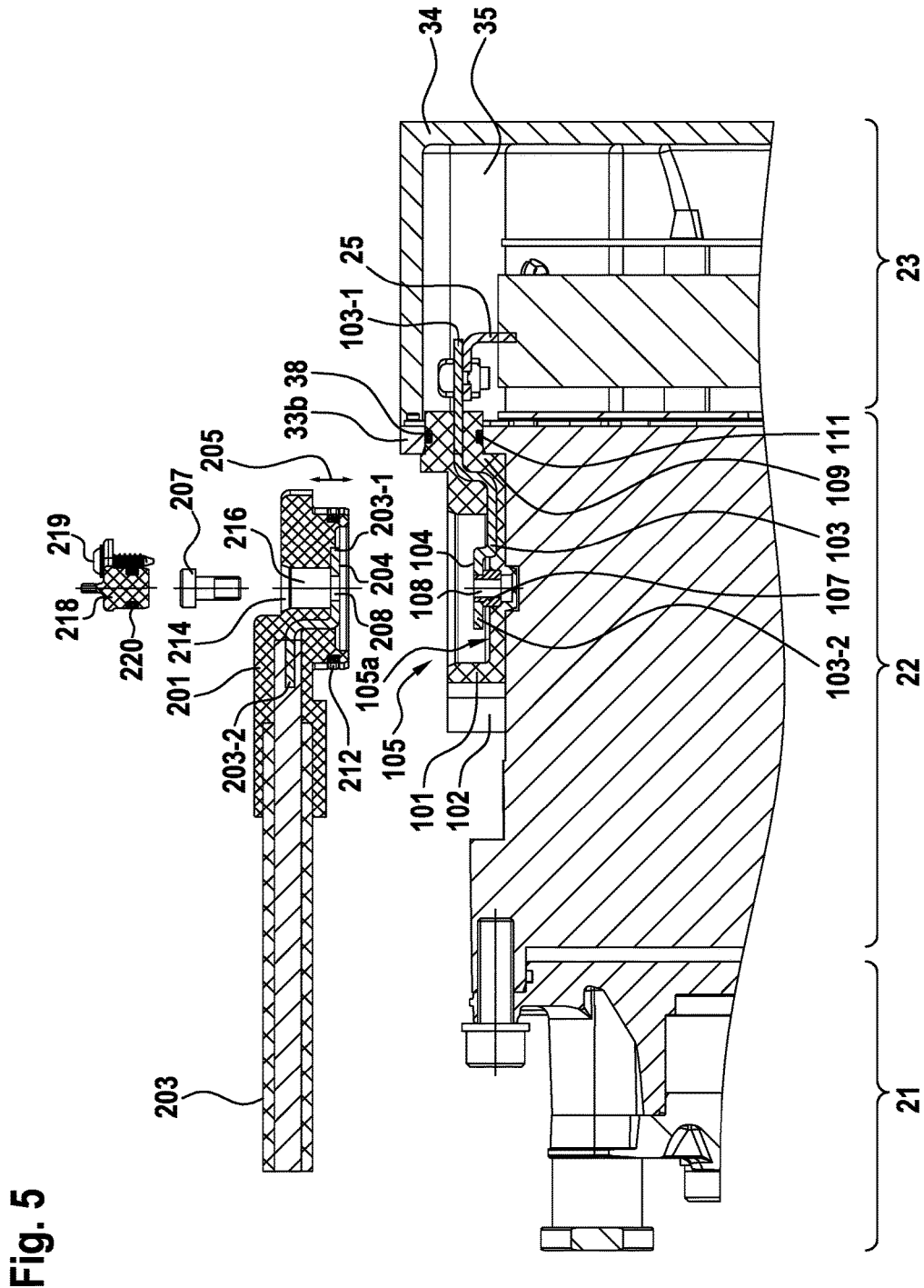

FIG. 4 shows a further perspective view of the MPU of FIGS. 1 to 3 with a control housing part removed in an oblique top view onto the terminal device and without representation of the line terminal device; and FIG. 5 shows a cross-sectional view of the MPU of FIG. 1, in which the section extends centrally through a terminal current conductor and accordingly through the line terminal device as well as the terminal device.

FIG. 1 shows a perspective view of a motor-pump unit (MPU) which is also referred to as a power pack, as one possible example of an electrified apparatus (e-apparatus). At the MPU 20 there is attached a preferred embodiment example of the connection device 300 according to the invention. The connection device 300 has a machine-side terminal device 100 which is connected with a line terminal device 200 on the side of a terminal current conductor 203. The terminal current conductor 203 here has a first terminal current conductor 203*a* and a second terminal current conductor 203*b* as a forward conductor and return conductor.

The MPU 20 consists substantially of a hydraulic displacement device in the form of a pump unit 21 which is located in a pump housing 32 closed with a pump lid 31. In the pump lid there are located two hydraulic ports 40*a*, 40*b* (40). The pump housing 32 side axially opposing the pump lid 31 is adjoined by a motor unit 22 which includes an electric motor for driving the pump unit 21, which motor is housed by a motor housing 33. The motor housing 33 is adjoined, on a side axially opposing the pump unit 21, at a housing flange 33*a* of the motor housing 33, by a control unit 23 which is housed by a control housing 34. The control housing 34 is connected with the motor housing 33 at the housing flange 33*a*.

The MPU 20 is one example of an e-apparatus, for whose coupling to a the connection device 300 is designed. The connection device 300 is here in particular designed for the transmission of high currents of 80 A and more, preferably for at least 125 A.

The connection device 300 having the terminal device 100 and the line terminal device 200, in the following described in more detail by the example of the MPU 20, due to its compact and thus space-saving design is suitable in particular for the coupling of e-apparatuses, such as electric units or electrified machines in the automotive field, for the linking to the onboard electrical system in order to supply the e-apparatus with the electric power required for its operation.

FIG. 2 shows a further perspective view of the MPU 20 of the FIG. 1 in an oblique top view onto the terminal device 100, in which the line terminal device 200 is detached from the terminal device 100. The terminal device 100 is fastened at the motor housing 33 from outside with three screws 37*a*, 37*b* and 37*c*. In addition, FIG. 3 is a further perspective view of the MPU 20 of the FIGS. 1 and 2, in which the MPU 20 was rotated by approx. 120° around the longitudinal axis, so that FIG. 3 shows an oblique top view onto the terminal device 100.

In the terminal part 101 there is located a receiving means 105, into which an insertion portion 205 (cf. FIG. 5) of the line terminal part 201 can be inserted for establishing the connection device 300.

For the sake of a better description, reference is made at the same time to FIG. 4 in which a further perspective view of the MPU 20 with the control housing portion 34 removed and without line terminal device 200, shown in the FIGS. 1 to 3, is represented in order to obtain an unobstructed oblique top view onto the terminal device 100.

In FIG. 4 one can recognize that the terminal part 101 of the embodiment example, for leading through two connection current conductors 103*a*, 103*b* (103) in a fashion electrically insulated against each other and against the housing 30, leads through the terminal part 101 into the interior 35 (cf. FIG. 5) of the housing 30. At a respective internal end 103-1*a*, 103-1*b* (103-1) there, the connection current conductors 103*a*, 103*b* (103) are connected with an associated current terminal 25*a*, 25*b* (25) of the MPU 20.

In the preferred embodiment example, the connection current conductors 103 are fasted at the associated current terminal 25 with a detachable screw connection, in which a screw is led through a bore in the respective internal end 103-1 of a connection current conductor 103 and is screwed on a nut pressed into the opposing current terminal 25. Alternatively, instead of the screw connection there may also be effected a connection by means of a rivet. A rivet connection is understood here to be a detachable connection, because the connection partners (here: connection current conductor 103 and current terminal 25) can be detached from each other without destruction; merely the rivet is destroyed, but this can be easily replaced by a new rivet upon re-connection.

At its external end 103-2*a*, 103-2*b* (103-2) (i.e. located outside relative to the interior of the housing) the respective connection current conductor 103*a*, 103*b* (103) has respectively one first contact area 104*a*, 104*b* (104) which protrudes from the direction of the housing flange 33a in a fashion spaced apart from a bottom area 105a of the receiving means 105 into the receiving means 105.

The receiving means 105 in the terminal part 101 in the represented embodiment example is formed cylindrical and complementary to the insertion portion 205 of the cylindrical line terminal part 201. The line terminal part 201 has a first profile element 202 which is configured such that it can be joined with the terminal part 101 only in the rotational position of the line terminal part 201 which is shown in FIG. 1 and is thus predetermined. For this purpose, the terminal part 101 has a second profile element 102 formed complementary to the first profile element 202. In the embodiment example the second profile element 102 fits form-fittingly into the first profile element 202. I.e., the receiving means 105 and the insertion portion 205 are respectively formed in a complementary cylindrical and mutually matched fashion. The insertion portion 205 can thus first be easily inserted into the receiving means 105. However, the insertion portion 205 can be fully inserted into the receiving means 105 only in the predetermined rotational position/alignment shown in FIG. 1. Thus, the connection device 300 in a connected state is additionally secured against a twist of the line terminal part 201 relative to the terminal part 101 and the connection elements 207a, 207b still to be described in more detail are protected against shear forces.

The terminal part 101 of the connection device 300 is fastened, as explained above, at the motor housing 33 of the e-machine 20, with a lead-through portion 109 aligned with the side of the housing flange 33a being put through a housing lead-through 38, formed complementary thereto, in the housing flange 33a. As already described above, the connection current conductor 103 extends through the terminal part 101, namely through the lead-through portion 109 into the interior 35 of the housing 30, in the preferred embodiment example into the interior 35 of the control housing 34.

FIG. 5 shows a cross-section of the MPU 20 of the FIGS. 1 to 4, the section being such that it extends centrally through a terminal current conductor 203 and accordingly through the line terminal device 200 and also through the terminal device 100. For a better, in particular enlarged representation, the lower portion of the MPU 20 has been omitted in FIG. 5. Moreover, the interior of the MPU 20, as far as not relevant here, is not represented in detail but only as a hatched area.

One can recognize in FIG. 5, that the line terminal part 201 of the line terminal device 200, through which the terminal current conductor 203 is led, can be inserted form-fittingly and at least partly into the receiving means 105 such that the first contact area 104 of the terminal portion 101 can be brought into a plane-surface electric contact having a sufficiently large cross-section with a second contact area 204 of the terminal current conductor 203. The cross-section corresponds substantially to the first contact area 104 and second contact areas 204 which were brought into coincidence.

A first connection element 107 integrated in the terminal part 101 in the form of a nut, which at the bottom side is fastened with the connection current conductor 103 approximately centrally in the first contact area 104 by pressing, can be inserted with a second connection element 207 (207a, 207b), in the form of a screw which is inserted through a lead-through 216 in the line terminal part 201, after insertion of the line terminal part 201 into the receiving means 105, perpendicularly through the second contact area 204 and perpendicularly through the first contact area 104 and then be screwed to the first connection element 107. By screwing, the second connection element 217 cooperates with the first connection element 107 in such a way that the first contact area 104 and the second contact area 204 are pressed onto each other corresponding to the torque of the screw. In doing so, at the same time the line terminal part 201 is fastened to the terminal part 101.

For leading through the detachable screw as the second connection element 207 (207a, 207b), corresponding through holes 108, 208 are located in the first contact area 104 and the second contact area 204, respectively, through which the screw can be respectively led, in order to then, by screwing, cooperate with the nut integrated in the terminal part 101 as the first connection element 107 (107a, 107b). The detachable screw is screwed into the nut, thereby accordingly fastening the line terminal part 201 to the terminal part 101, while at the same time the first contact area 104 in the terminal part 101 is appropriately strongly pressed together with the second contact area 204 in the line terminal part 201.

Via the dimensioning of the cross-section of the first and second contact areas 104, 204 pressed onto each other there can be ensured a desired, i.e. sufficiently low, transition resistance. Preferably, the size of the contact areas is dimensioned such that it is a multiple of the conductor cross-sections. For example, in a certain embodiment, the conductor cross-section is 16 $mm^2$ or 25 $mm^2$ and the contact areas are dimensioned with approx. 80 $mm^2$, i.e., the contact areas are at least three times, preferably five times greater than the conductor cross-section. Hence, the established connection device 300 is suitable for supplying particularly high currents via the terminal current conductor 203 to the current terminal 25.

As represented in the FIGS. 1, 2 and 5, in the line terminal part 201 there is located an external opening 214 of the lead-through 216 for the screw as the second connection element 207 (207a, 207b) and a detachable cap 218 for closing the opening 214. The cap 218 is fastened at the line terminal part 201 with a detachable fastening means 219a, in the embodiment example likewise a screw. The screw as a detachable fastening means 219a extends through a bore in the cap 218 and engages in a respective bore in the line terminal part 201 in which, depending on the material of the line terminal part 201, a corresponding thread 219 may be provided.

In an alternative (not shown), the cap can be respectively one single cap provided for each lead-through 216a, 216b. The single caps may respectively have an external thread which engages in a corresponding internal thread at the respective lead-through 214a, 214b.

As can be recognized in the FIGS. 2 and 5, the terminal current conductor 203 runs substantially as an insulated cable into the line terminal part 201 and there in the interior is connected with an internal end of a second connection conductor, for example by crimping, welding, or the like. The second connection conductor extends substantially parallel to the motor housing 32 and then in the line terminal part 201 in angled fashion toward the motor housing 30 of the MPU 20 and finally ends with the second contact area 204 which is aligned parallel to the first contact area 104.

The whole connection device 300 is configured preferably such that it is suitable for usage in environments having particular requirements, as in the outer vehicle region and for this purpose fulfils the requirements according to IP6K9K of the ISO 20653. For this purpose, at the line terminal part 201 there is disposed a first seal 212 which with the line terminal part 201 being inserted seals the receiving means 105 of the terminal part 101 outwardly. At the cap 218 respective second seals 220 are disposed in such a way that with the cap 218 being inserted they respectively seal the associated lead-through 216a, 216b (216) in the line terminal part 201 outwardly. Finally, at the lead-through portion 109 of the terminal part 101 there is provided a third seal 111 which with the terminal part 101 resting against the MPU 20 seals the housing lead-through 38 outwardly.

With the present invention there was provided a connection device 300 for high currents for detachably connecting an e-apparatus (e.g. the MPU 20) with a terminal current conductor 203. The connection device 300 consists of a corresponding terminal device 100 having a terminal part 101 and a corresponding line terminal device 200 having a line terminal part 201. The terminal part 101 is arranged for being fastened to a housing part 33 of the e-apparatus, i.e. is fastenable there. A connection current conductor 103 is led through the terminal part 101 in the housing interior 35 of the housing 30 and is connected at an end 103-1 there with the current terminal 25. At the other end, the external end 103-2, the connection current conductor 103 has a first contact area 104. The line terminal part 201, through which the terminal current conductor 200 is led, can be form-fittingly inserted at least partly into the receiving means 105 at the terminal part 101 in such a way that the first contact area 104 and the second contact area 204 of the terminal current conductor 203 contact each other. For establishing an especially good connection for transmitting high currents, the first contact area 104 and the second contact area 204 via a screw as the detachable first connection element 207, which is led through a lead-through 216 in the terminal part 201, through the second contact area 204 and through the first contact area 104 and there cooperates with a nut as first connection element 107, integrated in the terminal part 101, in such way that the first contact area 104 and the second contact area 204 are pressed onto each other by the screwing. This ensures an especially low transition resistance. In a particularly advantageous way, upon establishing the good electric contact between the first contact area 104 and the second contact area 204, at the same time the line terminal part 201 is detachably fastened to the terminal part 101.

The invention claimed is:

1. A line terminal device of a connection device for high currents as a detachable connection of an e-apparatus with a terminal current conductor, wherein the line terminal device has the following:
a line terminal part for insertion into a receiving mechanism at a terminal part of a terminal device which is fastened at a housing part of the e-apparatus and leads a connection current conductor through the terminal part into an interior of a housing and connects at an internal end with a current terminal and at an external end has a first contact area,
wherein through the line terminal part there is led the terminal current conductor which at one end in the terminal part has a second contact area,
wherein the line terminal part is insertable into the terminal part such that the second contact area can contact the first contact area of the connection current conductor, and a detachable second connection element, with the line terminal part being inserted, can be led through a lead-through in the terminal part, through the second contact area and through the first contact area and cooperate with a first connection element integrated in the terminal part such that the first contact area; and the second contact area can be pressed onto each other and at the same time the line terminal part can be fastened to a machine part,
wherein the terminal current conductor, when the line terminal part is inserted in the terminal part, extends at least partly in the line terminal part parallel to the housing, and then in the line terminal part in angled fashion toward the housing, and, finally, the second contact area extends parallel to the first contact area.

2. The line terminal device of claim 1 in the connection device for high currents as the detachable connection of the e-apparatus with the terminal current conductor, wherein the connection device has the terminal device, wherein the terminal device has the following:
the terminal part for fastening to the housing part of the housing of the e-apparatus and for leading the connection current conductor through the terminal part into the interior of the housing, wherein the connection current conductor at the internal end in the interior of the housing is connectable with the current terminal and at the external end has the first contact area;
the receiving means into which the line terminal part of the line terminal device, through which the terminal current conductor is led, can be inserted in such a way, that the first contact area can contact the second contact area of the terminal current conductor; and
the first connection element integrated in the terminal part, which is arranged to cooperate with the second connection element which can be inserted through the lead-through in the line terminal part after insertion of the line terminal part, through the second contact area and through the first contact area, such that the first contact area and the second contact area can be pressed onto each other and at the same time the line terminal part can be fastened to the terminal part,
wherein the terminal part of the terminal device is fastened at the housing part of the e-apparatus and the connection current conductor extends through the terminal part into the interior of the housing and at the internal end is connected with the current terminal and at the external end has the first contact area;
wherein through the line terminal part there is led the terminal current conductor and the line terminal part is inserted in the receiving mechanism at the terminal part such that the first contact area contacts the second contact area; and
wherein the detachable second connection element extends through the lead-through in the line terminal part inserted in the terminal part, through the second contact area and through the first contact area and cooperates with the first connection element integrated in the terminal part such that the first contact area and the second contact area are pressed onto each other and the line terminal part is detachably fastened at the terminal part.

3. The device according to claim 1,
wherein at the line terminal part an opening of the lead-through for the second connection element is closed with a detachable cap.

4. The device according to claim 2,
wherein a cap is fastened at the line terminal part with a detachable fastening mechanism; or
wherein the cap has an external thread which engages in an internal thread at the lead-through.

5. The device according to claim 1,
wherein the first connection element is disposed at the connection current conductor in the region of the first contact area.

6. The device according to claim 1,
wherein the second connection element is a screw and the first connection element is a connection nut loosely disposed beside the connection current conductor or fastened thereto.

7. The device according to claim 1,
wherein the receiving means in the terminal part is formed complementary to an insertion portion of the line terminal part.

8. The device according to claim 1,
wherein a portion of the connection current conductor with the first contact areas protrudes in a fashion spaced apart from a bottom area of the receiving means into the receiving means.

9. The e-apparatus with the connection device according to claim 2, wherein the terminal part of the connection device is fastened at the housing part of the e-apparatus, wherein the terminal part with the lead-through portion extends through a complementary formed housing lead-through.

10. The e-apparatus according to claim 9, wherein a connection current conductor in the interior of the housing is connected at an end there with the current terminal of the e-apparatus by means of the detachable connection.

11. The e-apparatus according to claim 9, wherein the terminal part is fastened at the housing from outside and/or from inside by means of one or several connection elements.

12. The e-apparatus according to claim 9, wherein the e-apparatus is an electrohydraulic motor-pump unit, MPU, consisting of a pump unit, a motor unit and a control unit.

13. The e-apparatus according to claim 9, wherein the connection device is intended for coupling the e-apparatus to a voltage of 12 V to 400 V for the supply with high electric currents.

14. The e-apparatus according to claim 9, wherein the housing part preferably has a housing flange for connection with a further housing part.

15. The e-apparatus according to claim 14, wherein the housing lead-through is located in the housing flange.

16. The e-apparatus according to claim 13, wherein the connection device is intended for coupling the e-apparatus to a voltage of one of 12 V, 24 V, 48 V or 400 V.

17. The e-apparatus according to claim 13, wherein the connection device is intended for coupling the e-apparatus to a voltage in a 12 V, 24 V or 48 V onboard electrical system.

18. The e-apparatus according to claim 13, wherein the high electric currents are at least 80 A to 150 A.

19. The e-apparatus according to claim 13, wherein the high electric currents are at most 125 A.

* * * * *